(12) United States Patent
Brevini

(10) Patent No.: US 12,331,739 B2
(45) Date of Patent: Jun. 17, 2025

(54) PISTON PUMP

(71) Applicant: MIXTRON S.R.L., Reggio Emilia (IT)

(72) Inventor: Stefano Brevini, Reggio Emilia (IT)

(73) Assignee: MIXTRON S.R.L., Reggio Emilia (IT)

( * ) Notice: Subject to any disclaimer, the term of this patent is extended or adjusted under 35 U.S.C. 154(b) by 0 days.

(21) Appl. No.: 18/264,618

(22) PCT Filed: Jan. 17, 2022

(86) PCT No.: PCT/IB2022/050340
§ 371 (c)(1),
(2) Date: Aug. 8, 2023

(87) PCT Pub. No.: WO2022/172097
PCT Pub. Date: Aug. 18, 2022

(65) Prior Publication Data
US 2024/0117805 A1    Apr. 11, 2024

(30) Foreign Application Priority Data
Feb. 11, 2021    (IT) .................. 102021000003014

(51) Int. Cl.
*F04B 1/145*    (2020.01)
*F04B 53/16*    (2006.01)
*F16J 15/3212*    (2016.01)

(52) U.S. Cl.
CPC .............. *F04B 53/16* (2013.01); *F04B 1/145* (2013.01); *F16J 15/3212* (2013.01)

(58) Field of Classification Search
CPC . F04B 1/14–188; F04B 53/16; F16J 15/3208; F16J 15/3212
See application file for complete search history.

(56) References Cited

U.S. PATENT DOCUMENTS

| | | | |
|---|---|---|---|
| 9,677,548 B2 | 6/2017 | Paderni et al. | |
| 2006/0045782 A1* | 3/2006 | Kretzinger | F04B 53/16 417/559 |
| 2014/0328699 A1* | 11/2014 | Nathan | F04B 53/22 417/222.1 |
| 2016/0327035 A1* | 11/2016 | Shen | F04B 1/124 |
| 2021/0131407 A1* | 5/2021 | Argentino | F04B 1/0452 |
| 2021/0131420 A1* | 5/2021 | Argentino | F04B 1/18 |

FOREIGN PATENT DOCUMENTS

EP    2466138 A1    6/2012

* cited by examiner

*Primary Examiner* — Thomas Fink
(74) *Attorney, Agent, or Firm* — FISHERBROYLES, LLP; Roger L. Browdy; Ronni S. Jillions

(57) ABSTRACT

A piston pump is described for pumping a liquid including a head in which at least a cylinder is disposed, a piston slidably inserted in the cylinder, a first sealing annular gasket which circumferentially sealingly contacts the piston, a second sealing annular gasket which circumferentially sealingly contacts the piston, and an annular body which circumferentially encloses the piston and is at least partially accommodated in a housing seat disposed in the head in a portion of the cylinder. The annular body includes a first housing seat in which the first sealing annular gasket is housed, a second housing seat in which the second sealing annular gasket is housed, and a third housing seat in which a third sealing annular gasket is housed, which is placed between the annular body and the housing seat of the annular body.

5 Claims, 5 Drawing Sheets

PISTON PUMP

TECHNICAL FIELD

The present invention relates to a piston pump, in particular a piston pump for high pressures and usable with low-viscosity fluids.

PRIOR ART

Piston pumps generally comprise a head wherein at least a cylinder is obtained, at least partially forming a pumping chamber, and wherein a piston slides for pumping liquid. Between the cylinder and the piston at least a pair of sealing annular gaskets are interposed which surround the piston contacting it and are adapted to remove, or at least dramatically reduce, pressured fluid leakages which would otherwise pass through the gap between cylinder and piston.

Generally the gaskets are substantially stacked one over the other, relative to a direction that is parallel to a sliding axis of the piston relative to the cylinder, in an (annular) seat obtained in the cylinder, possibly interposing anti-extrusion annular elements between said gaskets.

A problem of such solution is that the gaskets must be inserted and stacked manually one after the other into the seat obtained in the cylinder by an operator, which is a labour-consuming operation, especially when, as in most cases for the pumps available on the market, the diameter of the piston is lower than 5 cm and prevents an easy access of the operator hand into the housing seat.

Furthermore, regardless of the piston size, hence of the pump, when the piston is inserted in the cylinder, through the gaskets, the gaskets may be displaced. Even in case they are not displaced, as they are deformable, they are not however a particularly efficient guide for inserting the piston.

The known solution thus affects the pump production times.

An object of the present invention is to overcome the limits of the prior art in the context of a rational and cost-effective solution. The dependent claims outline preferred and/or particularly advantageous aspects of the invention.

DISCLOSURE OF THE INVENTION

In particular, the invention makes available a piston pump for pumping liquid comprising:
  a head wherein at least a cylinder is obtained,
  a piston slidably inserted in the cylinder,
  a first sealing annular gasket which circumferentially sealingly contacts the piston, i.e. a portion of the piston,
  a second sealing annular gasket which circumferentially sealingly contacts the piston, i.e. a portion of the piston,
  an annular body, which circumferentially encloses the piston, i.e. a portion of the piston, and is at least partially housed in a housing seat obtained in the head in a portion of the cylinder,
said annular body comprising:
  a first housing seat wherein the first sealing annular gasket is housed,
  a second housing seat wherein the second sealing annular gasket is housed,
  a third housing seat wherein a third sealing annular gasket is housed, which is interposed between the annular body and the housing seat of the annular body.

The annular body according to the invention allows to speed up the assembly operations while manufacturing the pump and the maintenance operations, as introducing the gaskets into the annular body and later introducing the annular body in the cylinder is simpler, and therefore quicker, than introducing the gaskets directly into the cylinder as in the prior art devices.

According to an aspect of the invention, the pump may comprise a crankcase fixed to the head, which is provided with a piston guide annular surface, and another housing seat of the annular body, which houses a portion of the annular body projecting from the head. It is thereby possible to perform the centering of the gaskets by processing precisely the crankcase, which has to be processed to make the guide annular surface of the piston, in its portion of the housing seat of the annular body, without having to process the cylinder portion of the head precisely, speeding up and reducing production times, as it is not required that both housing seats of the annular body, in the crankcase and in the head, are made precisely to obtain a proper centering of the gaskets. In particular thanks to such solution the seat of the annular body in the head may be made with a lower degree of precision than the housing seat made in the crankcase and therefore also lower than the precision for manufacturing the guide surface (where precision means a combination of dimensional tolerances, coaxiality tolerances and the tolerance regarding the position relative to a fixed reference point of the pump, for instance defined by the screws fixing the head to the crankcase).

Such centering of the gasket is important for the following reasons.

The gap between piston and cylinder reaches the pump crankcase, wherein a mechanism for driving the pistons is contained configured to move them with a reciprocating movement inside the cylinder to pump the liquid. Such mechanism is a crankshaft in the case of reciprocating piston pumps and a rotating plate in the case of rotating-plate axial pumps.

Leakages are even more detrimental in case the pumped liquid is for instance water and in case oil or grease for lubricating the driving mechanism are present in the crankcase, as the pumped liquid would contaminate the lubricant, reducing the efficacy thereof.

The aforesaid sealing gaskets, generally lipped, are subject to wear due to the fact that they rub against the piston, i.e. against the lateral cylindrical surface of the piston.

A high level of coaxiality between the gaskets and the piston is required in order to avoid wear concentration areas which would result in a premature malfunction of the gasket, and to obtain a proper distribution of the pressures exerted by the gaskets on the piston, without which even a new gasket might cause leakages.

In order to obtain such a high level of coaxiality, in the prior art pumps, a precise processing is required, therefore expensive and time-consuming, to make the hole of the cylinder, in particular in order to center the position of the hole of the cylinder relative to the head and the crankcase, and/or to make a housing seat of the gaskets which is obtained in the cylinder.

Such problem is further worsened in multi-cylinder pumps, in that, as the number of cylinders increases, the more labour-consuming it is to ensure the coaxiality of the gaskets in all the cylinders, considering that in addition to the tolerances in each cylinder, also tolerances in the position of each cylinder in relation to the others must be taken into account.

The aspect of the invention according to which a housing seat of the annular body is made in the crankcase allows to avoid the aforesaid expensive and labour-consuming processing of the head in order to obtain coaxiality between the first and second sealing gasket and the piston, as the centering can be made by processing the crankcase, which has in any case to be processed to obtain the guide surface of the piston, and by the use of the annular body, which has in any case to be processed to obtain the seats for the gaskets.

According to another aspect of the invention, a head portion wherein the cylinder and the body of the annular seat are obtained may be made of a polymeric material.

It is thereby possible to obtain a head, and consequently a pump, that is lighter, cheaper and quicker to be manufactured than those made of metal of the prior art. Thanks to the centering of the gaskets implemented by the annular body and the seat obtained in the crankcase it is possible to exploit as much as possible the advantages provided by using a polymeric material, as the values of precision of the tolerances of the cylinders and seat obtained in the head which can be obtained by the head moulding operation do not require any operation of removal of material to improve precision, which would not be possible in the heads made of metal which have in any case to be processed to remove material after injection moulding or die-casting operations.

To underline these advantages set out above for which the invention allows the creation of a crankcase with more precise tolerances than the head, which is therefore faster to produce and cheaper than the prior art pumps t, the annular body may be housed in the housing seat obtained in the head with a value of clearance greater than a value of clearance with which the annular body is inserted in the other housing seat made in the crankcase.

The invention may further provide that the extension of the first housing seat in a direction parallel to a sliding axis of the piston in the cylinder may be greater than the extension in the same direction of the first sealing gasket.

The entire first gasket is thereby housed, in such direction, in the seat and the proper centering may be maintained during the functioning. Furthermore, the gasket is prevented from contacting the housing seat.

In addition the invention can provide that the piston has a first end which is always contained in the cylinder, the first housing seat can have an opening directed towards such first end and the pump can comprise a pre-load ring inserted in said opening, which contacts the first annular gasket and projects axially from the annular body through said opening.

It is thereby possible to pre-load the first gasket.

In particular, the first gasket, which is known as high-pressure gasket, is made of a more rigid material than the second gasket and thanks to the ring it can be pre-loaded even without pressured fluid.

According to still another aspect, the pump may be of the axial piston and rotating inclined plate type with automatic suction and delivery valves, provided with a plurality of cylinders parallel between each other wherein respective pistons for pumping liquid slide.

BRIEF DESCRIPTION OF THE DRAWINGS

Further characteristics and advantages of the invention will become clear from reading the following description provided by way of non-limiting example, with the aid of the figures illustrated in the accompanying tables.

BEST MODE OF THE INVENTION

Figure 1:
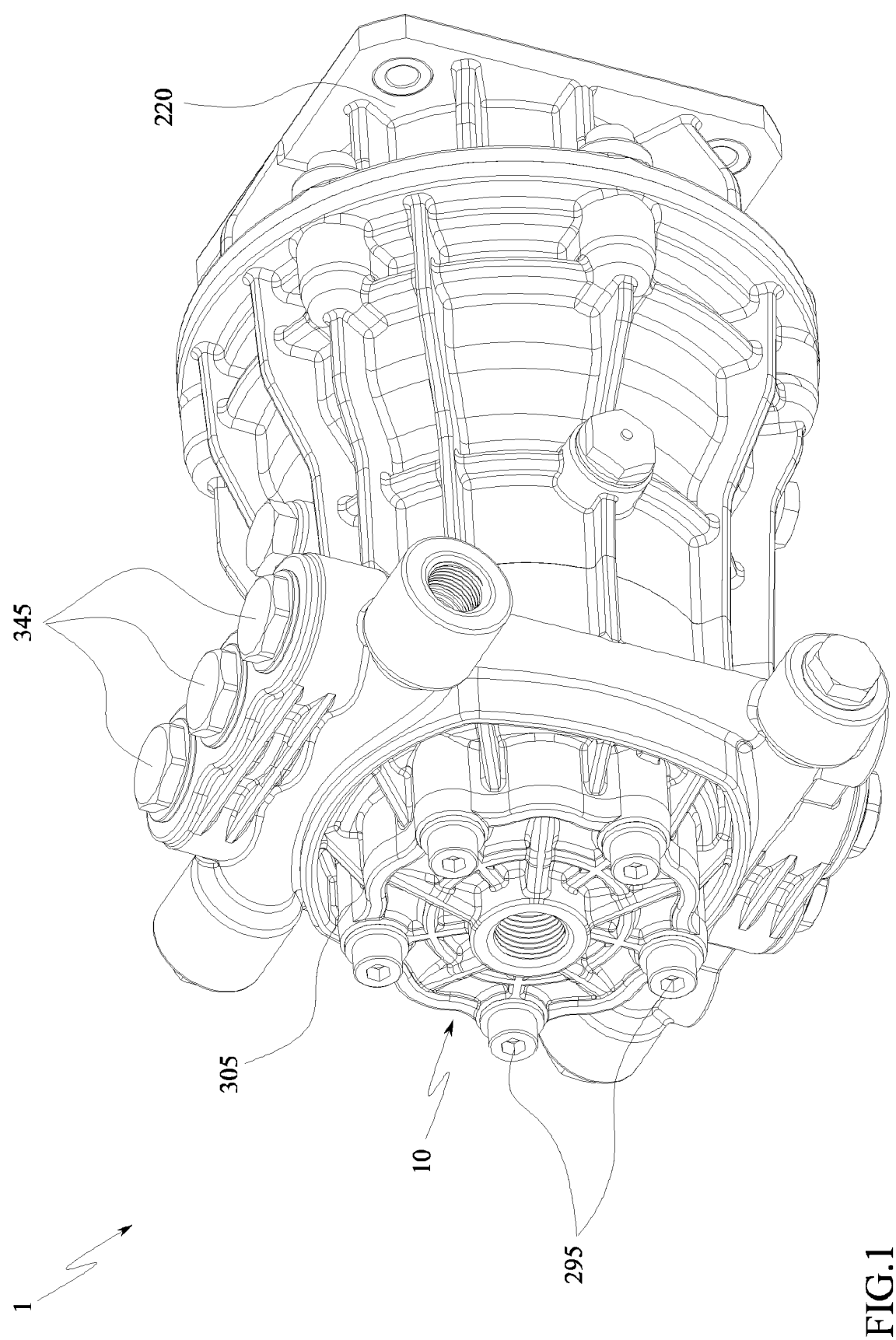
FIG. 1 is an axonometric view of a pump according to the invention.
Figure 2:
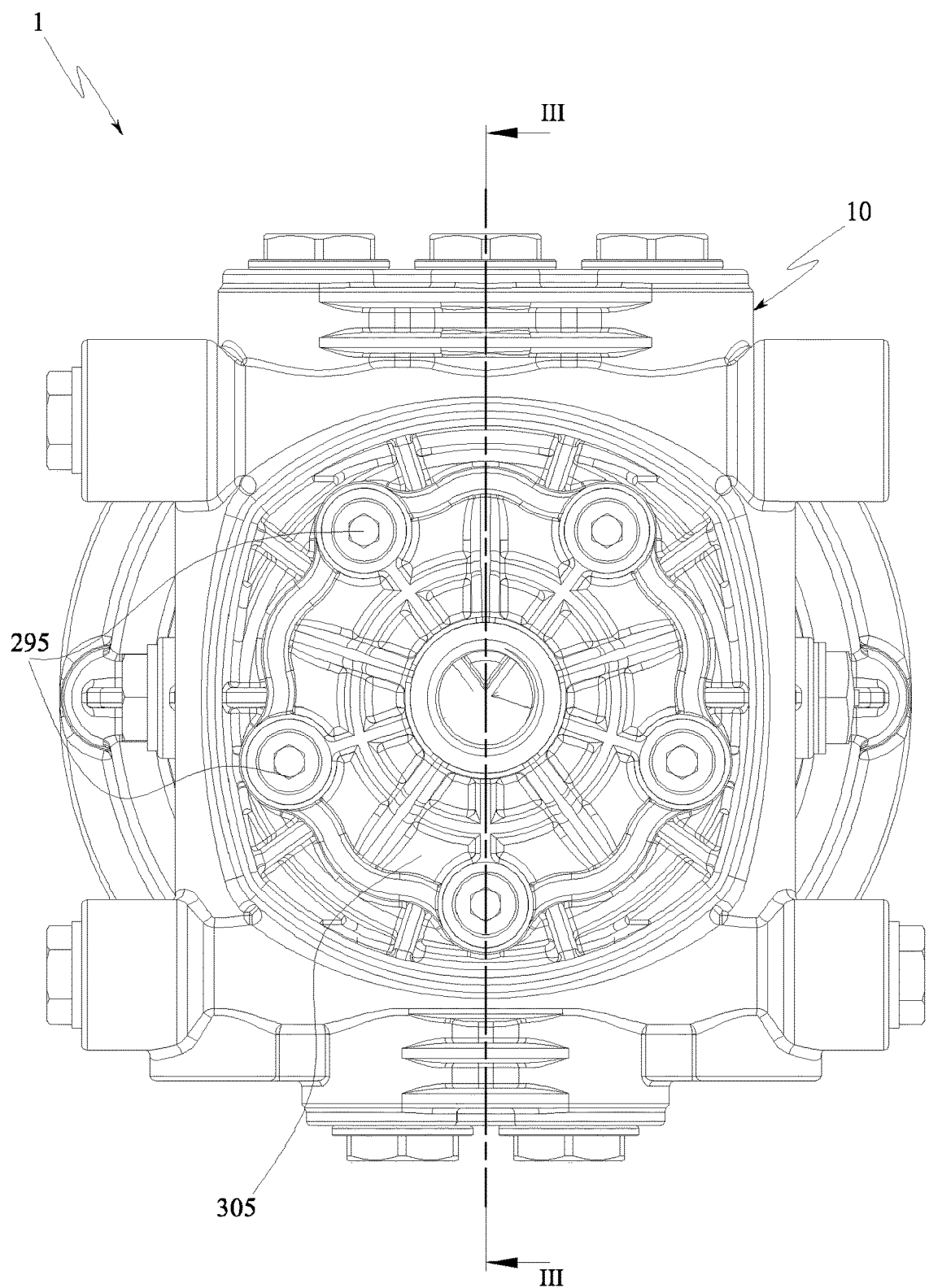
FIG. 2 is a front view of the pump of FIG. 1.
Figure 3:
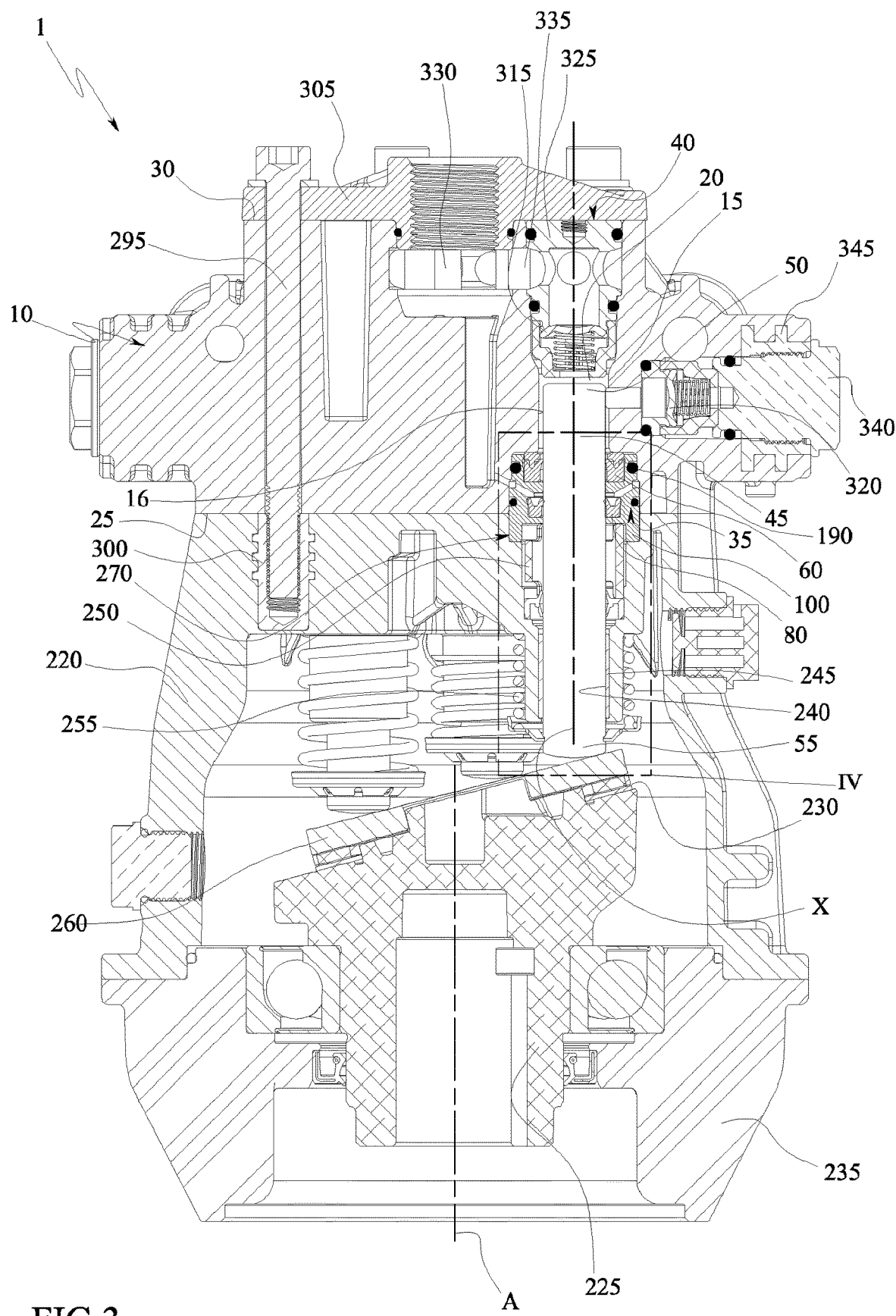
FIG. 3 is a section view according to the plane III-Ill of FIG. 2.

With particular reference to these figures, 1 indicates as a whole a piston high-pressure pump, preferably suitable for pumping liquids with a low viscosity, for example water. The pump shown is a multi-cylinder axial piston pump, however, the concepts of the invention can be applied to a single-cylinder and/or reciprocating pump. The concepts of the invention are more significant in relation to a multi-cylinder pump as it is more difficult to be manufactured and assembled. For instance due to the fact that a multi-cylinder pump, in particular one of the axial inclined-plate type with more than three cylinders, requires assembling a high number of components, thereby saving more time, and also due to the presence of various cylinders, it requires more precise processing to make it possible that all the mobile components and the respective seats and gaskets.

In particular, the pump 1 shown is of the type provided with a fixed-inclination rotating plate, as will be hereinafter better disclosed, and with automatic valves for adjusting the pumping flow.

The pump 1 comprises a head 10 wherein at least a cylinder 15 is obtained, i.e. a cylinder head, which at least partially defines a volume of a pumping chamber 20 of the liquid.

In the embodiment shown, the head 10 comprises a plurality of cylinders 15, i.e. circular rectilinear holes, for instance more than 3, each one defining at least partially a volume of a respective pumping chamber 20 of the liquid. The pumping chambers 20 are independent from each other, as will be cleared hereinafter.

The cylinders 15 thus have at least a tract characterised by a cylindrical inner surface 16. For example, at least the head portion wherein the cylinder is obtained, i.e. wherein the cylinders are obtained, may be made as a single-piece body, i.e. may be obtained by processing a single body obtained by the solidification of a single melt or injection of material in a mould.

In the preferred embodiment, such single-piece portion is made of a polymeric material, such to make the pump light, economic and quick to be manufactured.

It is not however excluded that in a non-shown embodiment, the head portion wherein the cylinder is obtained, i.e. the cylinders, is formed by more single-piece parts made of a polymeric material, fixed between each other.

The cylinders of the plurality of cylinders are more than three, that is at least four, preferably there are five, and are arranged with their respective central axes parallel to each other.

For example, the cylinders are arranged radially along a common axis, in relation to which the axes of the single central cylinders are parallel. Furthermore they are placed at an equal distance from each other and at the same distance with respect to the common axis. In other words, the cylinders, i.e. the central axes of the cylinders, are arranged at equidistant angles to each other along an imaginary circumference centred on the common axis and lying on a plane perpendicular to the common axis.

Still in the shown embodiment, in which there are five cylinders, the central axes of the cylinders pass through the vertices of an imaginary regular pentagon lying on a perpendicular plane to the central axes of the cylinders themselves.

The head may comprise a first face 25, which is transversal to the cylinder axis, i.e. the cylinder axes, and it is for instance plane, and an opposite second face 30, also transversal to the cylinder axis, i.e. of the cylinders.

The cylinder, i.e. the cylinders, are manufactured for instance during the moulding step of the polymeric material, as holes each one provided with an opening 35 made in the first face 25.

In particular, in the shown embodiment, the cylinder, i.e. the cylinders, is made as a through hole which extends from the first face 25 to the second face 30, forming a first opening 35 in the first face 25 and a second opening 40 in the second face 30.

It is not excluded that in an alternative embodiment it can be made as a blind hole, and that there is only the opening, i.e. the first opening in the first face 25.

The pump 1 comprises a piston 45 slidably inserted in the cylinder 15 and at least partially inserted in the cylinder, for instance only partially inserted in the cylinder. In other words the pump comprises a plurality of pistons 45, each one slidably inserted in a respective cylinder 15 of the plurality of cylinders, and partially inserted therein.

In the embodiment shown, the piston 45, i.e. each piston 45, has one first axial end 50 directed towards the pumping chamber 20 (for example which also delimits it partially) and an opposite second axial end 55 which projects from the cylinder 15 out of the head through the opening 35.

The pump 1 comprises a plurality of annular gaskets adapted to circumferentially sealingly enclose the piston 45, i.e. each piston 45, to avoid pumping liquid leakages from the pumping chamber towards the opening 35 in the first face 25.

In particular, the pump 1 comprises a first sealing annular gasket 60, commonly known as high-pressure gasket, which circumferentially sealingly contacts a portion of the piston 45 (therefore it circumferentially encloses with contact and is coaxial with the piston), i.e. a portion of a piston skirt 45.

The first sealing annular gasket is elastic, i.e. resilient, for instance made of a polymeric material.

It must be specified that in this specification the term elastic/resilient means capable of being significantly elastically deformed under the ordinary workloads it is submitted to in order to perform the task it is intended for. In the present case a gasket is elastically deformed to adhere to the concerned surfaces in order to generate a possibly watertight sealing.

The first sealing annular gasket 60 is preferably lipped.

Figure 5:
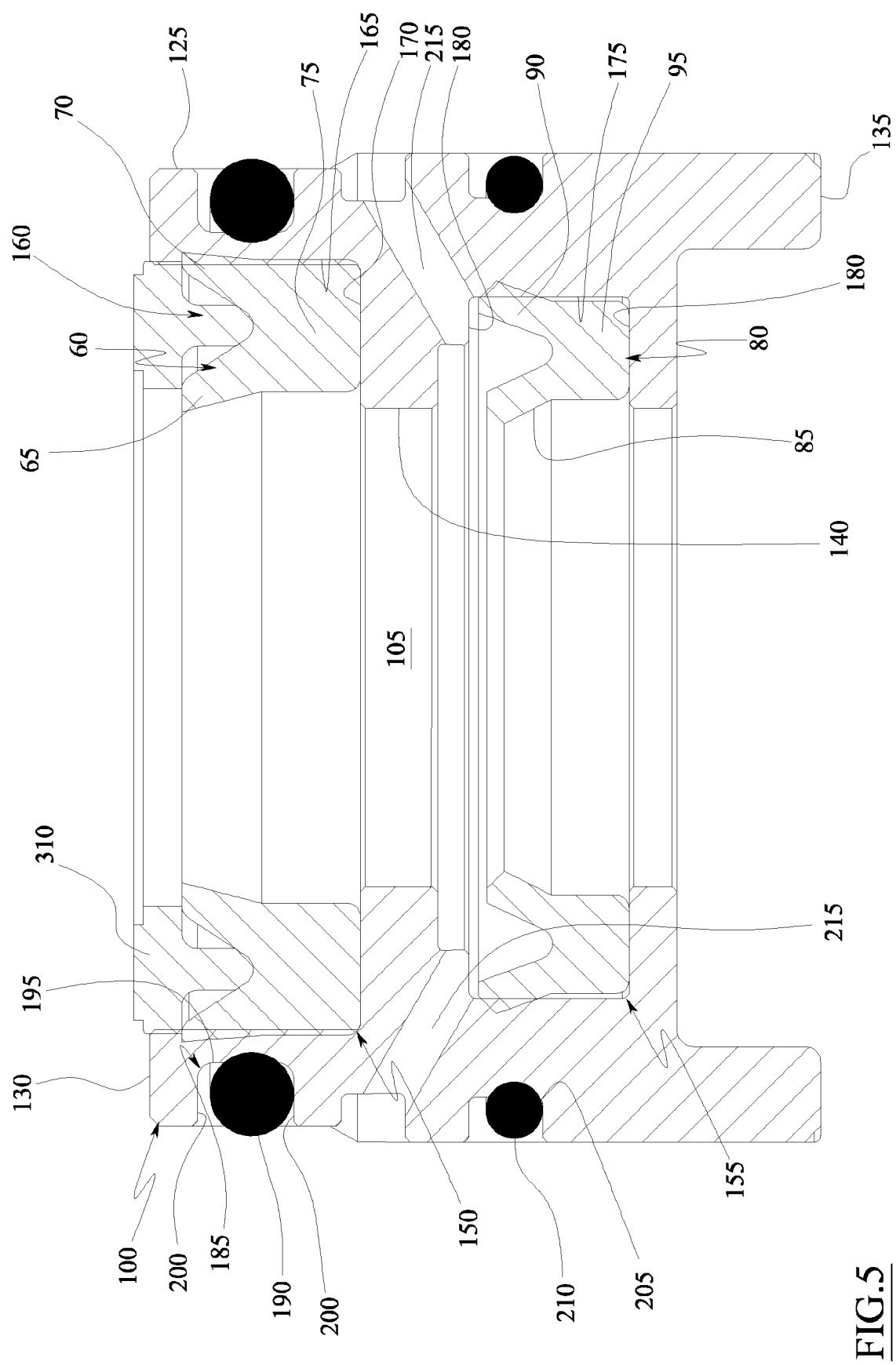
FIG. 5 is a view of an annular body according to the invention, represented in section as in FIGS. 3 and 4 and isolated from the remaining components of the pump.

Referring in particular to FIG. 5, the first annular gasket comprises an inner annular lip 65, which sealingly circumferentially contacts said portion of piston 45, and an outer annular lip 70, for instance substantially forming a cross-section V with the inner annular lip. The inner annular lip 65 and the outer annular lip 70 branch out from a same side of a ring 75, for instance having a cross section with a substantially rectangular shape.

The pump 1 also comprises a second sealing annular gasket 80, commonly known as low-pressure gasket, which sealingly circumferentially contacts a portion of the piston 45 (thus it encloses and is coaxial with the piston), i.e. a portion of the skirt of the piston 45 (such portion partially overlaps, almost entirely, the portion on which the first gasket acts). For instance, the two gaskets are aligned between each other along a direction parallel to the direction of the cylinder axis, with the first sealing annular gasket 60 closer to the first axial end 50 of the piston, i.e. to the pumping chamber 20, than the second sealing annular gasket.

Also the second sealing annular gasket is elastic, i.e. resilient, for instance made of a polymeric material.

Furthermore, also the second sealing annular gasket 80 is preferably of the lipped type. Like the first gasket, the second gasket comprises an inner annular lip 85, which sealingly circumferentially contacts said portion of piston 45, and an outer annular lip 90, for instance substantially forming a cross-section V with the inner annular lip.

The inner annular lip 85 and the outer annular lip 90 branch out from a same side of a ring 95, for instance having a cross section with a substantially rectangular shape.

In the shown embodiment, the pump comprises a first sealing annular gasket 60 and a second sealing annular gasket 80 for each cylinder 15 of the plurality of cylinders 15. The pump then comprises an annular body 100, i.e. a plurality of annular bodies 100, one for each piston, which encloses circumferentially a portion of the piston, i.e. which has a central through hole 105 (see FIG. 5, wherein the piston is not represented) in which a portion of the piston 45 is inserted, and is shaped so as to serve as a housing for the first and second sealing annular gasket and is at least partially accommodated in a housing seat 110 obtained in the head, in particular in the head at a portion of the cylinder (see the enlargement in FIG. 4). Still in greater detail at a portion of the cylinder near the opening 35.

The housing seat 110 is shaped as an annular lowering, i.e. an annular groove, made in the cylinder and flowing into the first face. In particular, the opening 35 is defined by such lowering.

Figure 4:
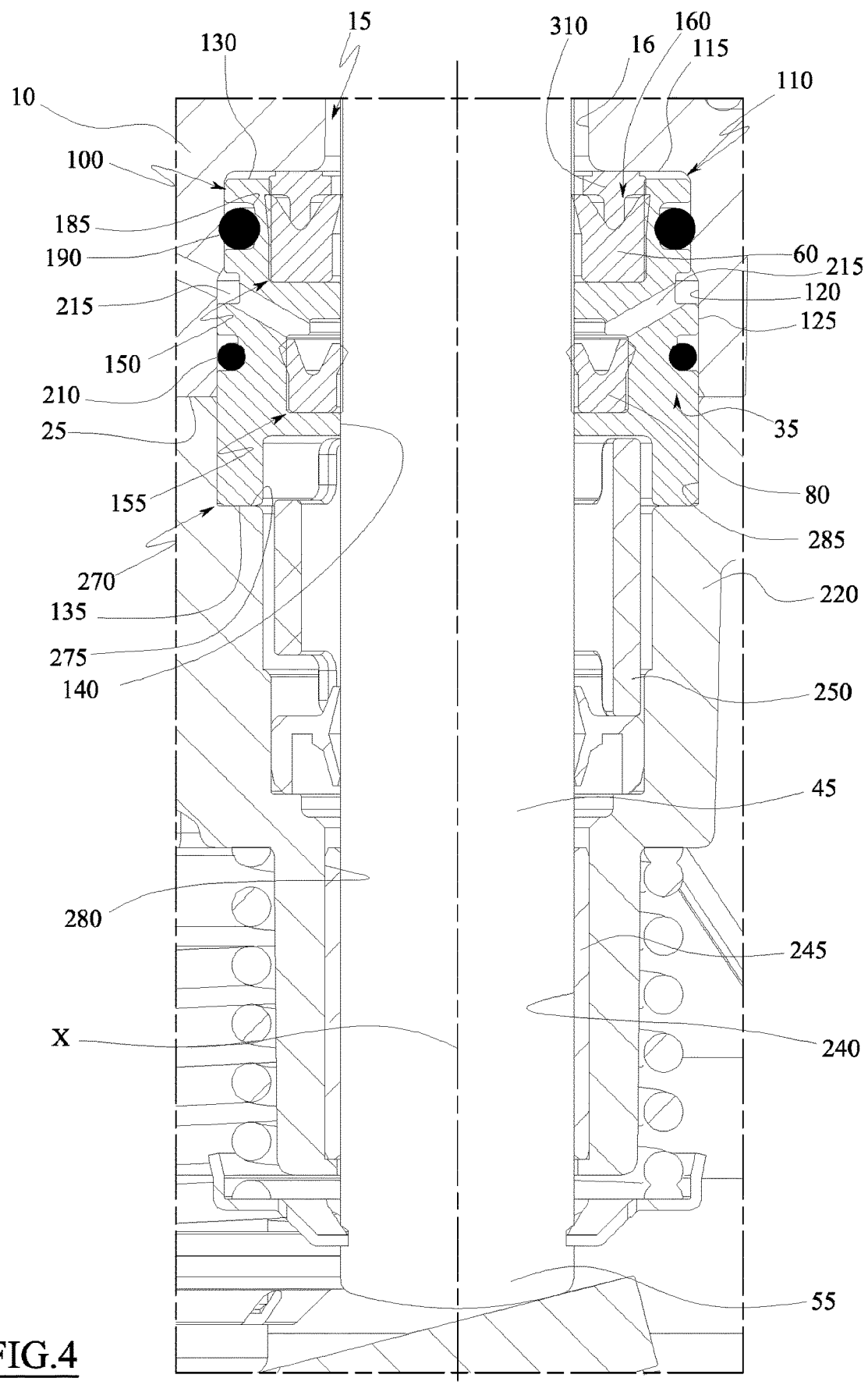
FIG. 4 is an enlargement of a detail IV of FIG. 3.

Referring in particular to FIG. 4, the housing seat 110 comprises an annular support surface 115 transversal to the central axis of the cylinder and extending from the cylindrical inner surface 16 of the cylinder 15 in a direction moving away from the central axis of the cylinder.

The annular support surface 115 is directed towards the second axial end 55 of the piston, i.e. towards the opening 35 in the head.

Preferably, such annular support surface 115 is plane, it is not however excluded that in an alternative embodiment it can be conical.

Still in the embodiment shown, the housing seat 110 also comprises a lateral annular surface 120 which extends along an axial direction of the cylinder, for example parallel to the central axis of the cylinder, from an outer perimeter, i.e. distal from the central axis of the cylinder, of the annular support surface 115, to the first face 25, for example forming the first opening. Said annular surface is thus coaxial to the central axis of the cylinder and to the cylindrical inner surface of the cylinder.

In the embodiment shown, the lateral annular surface 120 comprises at least a cylindrical portion, as, at least in the portion inserted in the housing seat 110, the annular body is shaped as a cylindrical body provided with the through hole 105 coaxial to the piston and in which the piston is inserted and slides, therefore it is provided with an outer lateral annular surface 125, opposite to an inner lateral annular surface which defines the through hole, provided with a cylinder-shaped portion.

In particular, in the embodiment shown, the lateral annular surface 120 comprises two cylindrical portions, one of which branches out from the annular support surface 115 and a second one, coaxial to the first one and with a diameter greater than the first one, which proceeds from an enlarged portion directly interposed between the first and the second ones, until it directly flows into the opening.

Consequently, also the outer annular portion 125 of the annular body has two cylindrical portions having a different diameter, so as to be complimentary to the annular lateral surface 120.

In an embodiment not shown, the lateral annular surface may have a polygonal cross section (according to a section plane perpendicular to the cylinder axis) in case the annular body is designed as a prism provided with a cylindrical through hole in which the piston slides.

The annular body is made ad single-piece body.

The annular body substantially comprises a first annular face 130, for instance plane, preferably transversal to the cylinder axis, directed towards the annular support surface 115, and an opposite second annular face 135, for instance plane, preferably transversal to the cylinder axis, directed in an opposite direction relative to the annular support surface 115.

The annular body shown further comprises an inner cylindrical annular surface 140, which substantially defines the through hole, and the outer annular lateral surface 125 which is directed in a direction opposite to the inner cylindrical annular surface 140 (directed towards the lateral surface of the housing seat). Such surfaces extend substantially between the two faces of the annular body.

The outer annular lateral surface 125 is inserted with a small clearance in the annular lateral surface 120 of the housing seat 110.

In practice such annular surfaces define the thickness, in a radial direction relative to the central axis of the cylinder of the annular body.

The annular body is substantially shaped as a (cylindrical) tubular body where the first annular face 130 and the second annular face 135 define the axial ends of the tubular body and the outer annular lateral surface 125 define the outer lateral wall of the (cylindrical) tubular body, and in which the cylindrical through hole 105 is formed coaxial to the cylindrical annular lateral surface (i.e. to the cylindrical portions thereof).

As mentioned above, the annular body 100 is shaped to serve as a housing for the first and second sealing annular gasket. In particular, it is shaped in such a way that the first and second sealing annular gasket are not in contact with the head 10.

In particular, it comprises a first housing seat 150 in which the first sealing annular gasket 60 is housed, and a second housing seat 155, in which the second sealing annular gasket is housed, said seats being shaped so as to put the gaskets in contact with the piston.

In detail the first housing seat 150 and the second housing seat 155 are shaped as annular grooves made in the inner cylindrical surface 140 of the annular body.

In detail, the first housing seat 150 further has an opening 160, annular-shaped, directed towards the first axial end 50 of the piston 45, i.e. towards the pumping chamber 20, or still, facing the annular support surface 115, which crosses the first annular face 130. In particular, such opening 160 extends up to the piston.

Referring in particular to FIG. 5, the first housing seat 150 thus comprises (or consists of) a lateral cylindrical surface 165 that extends from an inner cylindrical perimeter of the first annular face 130 (substantially defined by the intersection of the opening 160 with the first annular face 130), towards the inside of the annular body (along the central axis of the cylinder) to a plane annular surface 170 of the first housing seat which is transversal (perpendicular) to the central axis of the cylinder and extends to the inner cylindrical surface 140.

In practice, the first housing seat 150 is shaped as a cylindrical hole, with a diameter larger than the inner cylindrical surface 140, made through the first annular face 130 and which penetrates only for a predetermined portion of the annular body.

The extension of the first housing seat, in a direction parallel to the central axis of the cylinder, is greater than the extension in the same direction of the first sealing annular gasket. In other words, the distance of the plane annular surface 165 from the first annular face 130 is greater than the extension in the direction of the central axis of the cylinder of the first sealing annular gasket.

Or still in other words, the extension along said direction of the lateral cylindrical surface 165 is greater than the extension in the direction of the first sealing annular gasket 60. It must be specified that in the present specification, the plane annular surfaces are substantially shaped as circular rings lying on a plane.

The second housing seat 155 is shaped as an (entire) groove provided with a cylindrical bottom surface 175 facing the piston 45, for instance coaxial to the lateral cylindrical surface 165 of the first housing seat 150, from which two annular surfaces 180 opposite to each other extend, transversal (perpendicular) to the central axis of the cylinder, for instance plane, that reach the cylindrical inner surface 16.

The first housing seat 150 and the second housing seat 155 are spaced from each other by an annular wall of the annular body. For example, such wall is defined by the cylindrical inner surface 16, the lateral cylindrical surface 165 and the annular surface 180 proximal to the first housing seat 150.

Once inserted in the first housing seat, the first sealing annular gasket 60 contacts the lateral cylindrical surface 165 at least with the outer annular lip 70, and for example the plane annular surface 170 with the ring 75.

When the second sealing annular gasket 80 is inserted in the second housing seat 155, the gasket contacts the cylindrical bottom surface 175 with the outer annular lip, and for example the annular surface 180 distal from the first housing seat 150 with the ring 95.

The annular body 100 further comprises a third housing seat 185, directed towards the housing seat 110, in particular towards the annular lateral surface 120 of the housing seat 110. In said third housing seat 185 a third annular gasket 190 is contained, which is thus directly placed between the annular body and the housing seat 110, i.e. between the annular body and the annular lateral surface 120 of the housing seat 110, so as to obtain a watertight sealing between the annular body and the housing seat 110.

In detail, the third housing seat 185 is shaped as an annular groove made in the outer annular lateral surface 125 and directed towards the annular lateral surface 120. Referring in particular to FIG. 5, the third housing seat comprises a cylindrical bottom surface 195 facing the annular lateral surface 120, for instance coaxial to the lateral cylindrical surface 165 of the first housing seat 150, from which two annular surfaces 200 opposite from each other extend, transversal (perpendicular) to the central axis of the cylinder, for instance also plane, which arrive at the outer annular surface 125. The third housing seat is spaced from the first annular face 130 for a non-zero amount, that is a non-zero thick wall (defined by the annular body) is present between the first annular face and the annular surface 200 proximal to the first annular face 130. The third annular gasket 190 is for instance of the O-ring type, i.e. having a circular transversal section.

The third annular gasket 190 only contacts the third housing seat and the annular lateral surface 120 of the housing seat 110.

The annular body 100 may comprise also a fourth housing seat 205, directed towards the housing seat 110, in particular towards the annular lateral surface 120 of the housing seat 110 in the head. In said fourth housing seat 205 a fourth sealing annular gasket 210 is contained, which is thus directly placed between the annular body and the housing seat 110, i.e. between the annular body and the annular lateral surface 120 of the housing seat 110, so as to obtain a watertight sealing between the annular body and the housing seat 110.

In detail, the fourth housing seat 205 is shaped as an annular groove made in the outer annular surface 125 and directed towards the annular lateral surface 120.

In the embodiment shown, the fourth housing seat comprises a cylindrical bottom surface facing the annular lateral surface 120, for instance coaxial to the lateral cylindrical surface 165 of the first housing seat, from which two annular surfaces opposite from each other extend, transversal (perpendicular) to the central axis of the cylinder, for instance also plane, which reach the outer annular surface 125.

The fourth housing seat is spaced more from the first annular face 130 than the third housing seat. Furthermore, the fourth housing seat is spaced from the housing seat for a non-zero amount, that is a non-zero thick wall (defined by the annular body) is present between said two seats.

The fourth annular gasket 210 is for instance of the O-ring type, i.e. having a circular transversal section.

The fourth annular gasket 210 only contacts the fourth housing seat and the annular lateral surface 120 of the housing seat 110.

The annular body does not comprise gasket seats obtained in the first annular face 130 or in the second annular face 135.

The annular body is for example rigid, preferably made of metal, such as brass. The term rigid means that it does not significantly deform under the ordinary workloads it is submitted to.

The annular body 100 can also comprise a drainage channel 215, for instance a plurality of drainage channels, having a first passage mouth, obtained in a portion from the outer annular lateral surface 125 of the annular body comprised between the third and fourth housing seat, and a second passage mouth, made in a portion from the inner cylindrical portion 140 of the annular body comprised between the first and second housing seat. The pump 1 can comprise a crankcase 220, which is rigidly fixed (i.e. without residual degrees of freedom) to the head 10, and contacts it for instance at the first face 25. In particular, the crankcase 220 comprises a plane face placed directly in contact with the first face 25 of the head 10.

The crankcase 220 contains therein a driving mechanism configured to start the movement of the piston, or pistons, inside the cylinder in order to pump liquid.

In the embodiment shown, the driving mechanism comprises a rotating inclined plate 225, adapted to receive a rotatable motion by a driving shaft outside the pump.

The inclined plate 225 is housed in the crankcase 220, is rotatably associated therewith with respect to a rotation axis A (for instance coaxial to the common axis of the cylinders), and comprises a plane annular surface 230 lying on an inclined plane with respect to the rotation axis A. In particular, the inclined plate is rotatably associated by a bearing and a flange 235, which is bolted to the crankcase 220, and by which it is possible to fix the crankcase to a motor or frame to which the outer motor shaft is rotatably associated.

In particular, following the rotation of the inclined plate 225, the piston, or pistons, are slided along the sliding axis between a top dead position, in which the volume of the pumping chamber 20 is minimal, and a bottom dead position, in which the volume of the pumping chamber is maximum.

Furthermore, the crankcase can comprise a guide annular surface 240, for instance cylindrical, adapted to guide the piston 45 sliding in the cylinder, i.e. to which the piston is slidably associated, and defining a sliding axis X of the piston. Such sliding axis may not be perfectly coaxial with the central axis of the cylinder due to (dimensional and geometrical) productive tolerances.

In the embodiment shown, a guide annular surface 240 for each piston is present in the crankcase.

The guide annular surface 240 is made available for instance by a guide bushing 245, for instance made of metal, preferably steel, inserted in a housing hole made in the crankcase.

In the embodiment shown, the crankcase comprises a plurality of guide bushings 245 each one adapted to guide a respective piston 45 sliding along the corresponding cylinder.

Such guide bushing 245, i.e. each guide bushing 245, is in communication with the opening 35 made in the first face of the first head 10, i.e. with the respective opening made in the first face.

The pump 1 can comprise a spacer 250 that is axially hollow so that the piston can slide therein, which at an axial end contacts the annular body 100 and at an opposite axial end contacts an annular abutment surface transversal to the central axis of the cylinder, coaxial to the piston and placed between the guide bushing and the annular body. For example, the spacer also comprises a gasket which acts on the piston.

The second axial end of the piston, i.e. of each piston, is kept in contact, by the force exerted by a respective elastic element 255, of an annular guide 260 lying on the annular plane surface of the inclined plate 225, for instance by interposing a roller axial bearing. Each elastic element has a first end connected to the crankcase 220 and a second end connected to the piston 45, for example near the second end 55.

The second axial end 55 may be rounded and convex in shape and the annular guide 260 may have a plane annular surface parallel to the plane annular surface of the plate.

In one preferred embodiment, the crankcase comprises another housing seat 270 of the annular body 100, which houses a portion of annular body 100 that projects from the head 10, i.e. projects out of the head through the opening 35. It is thereby possible to implement the centering of the gaskets processing in a precise way the crankcase, which has to be manufactured to obtain the guide surface of the pistons, in its portion of the housing seat of the annular body.

In particular, the annular body, i.e. each annular body, is accommodated in the housing seat 110 obtained in the head 10 with a clearance value greater than a clearance value with which the annular body is inserted in the other housing seat 270 made in the crankcase.

Furthermore, the piston 45, i.e. each piston, is slidably inserted in the guide annular surface 240 with a clearance value at least equal to, preferably lower than the clearance value with which the annular body is inserted in the other housing seat.

In the embodiment shown, the crankcase comprises a through hole, i.e. hole passing through each cylinder, in which the guide annular surface 240 is obtained, i.e. in which the guide bushing is housed, and which is crossed from an end to another by the piston. The other housing seat 270 is made at such through hole, in the crankcase face contacting the first face 25 of the head.

The other housing seat 270 is shaped as an annular lowering, i.e. an annular groove, made in the through hole resulting in the crankcase face in contact with the head.

In the embodiment shown, the other housing seat 270 has a transversal annular support surface 275, such as perpendicular to the sliding axis of the piston and which extends from an annular inner surface 280 of the through hole, in a direction moving away from the sliding axis.

The annular support surface 275 is directed towards the first axial end 50 of the piston, i.e. towards the opening 35 of the head and towards the annular support surface 115 of the housing seat 110.

Preferably, such annular support surface 275 is plane, it is not however excluded that in an alternative embodiment it can be conical, based on the shape of the second face of the annular body.

Still in the embodiment shown, the other housing seat 270 comprises also an annular lateral surface 285 which extends along a direction parallel to the sliding axis, from an outer perimeter, i.e. distal from the cylinder central axis, of the annular support surface 275, to the crankcase face contacting the head, for instance forming said opening in the crankcase. Said annular lateral surface 285 is substantially coaxial to the guide annular surface 240. Furthermore, considering the production and assembly tolerances, the annular lateral surface 285 is coaxial to the annular lateral surface of the housing seat.

In the embodiment shown, the annular lateral surface 285 is cylindrical, and this is because, at least in the portion inserted in the other housing seat 270, the annular body is shaped as a cylindrical body.

The annular body is completely accommodated in the housing seat 110 made in the head 10 and in the other housing seat 270 made in the crankcase 220, i.e. in the volume defined by the respective surfaces.

The third and fourth sealing annular gaskets do not touch the other housing seat 270 made in the crankcase.

As mentioned above, the clearance value between the annular body and the housing seat is greater than the clearance value between the annular body and the other housing seat.

In particular, the clearance value between the outer lateral surface 125 of the annular body and the annular lateral surface 120 of the housing seat 110 is greater than the clearance value between the outer lateral surface 125 of the annular body and the annular lateral surface 285 of the other housing seat 270.

In other words, the precision in coupling the annular body with the annular body seat of the crankcase is greater than the precision in coupling the annular body with its seat in the cylinder.

It must be specified that clearance value means the minimum possible thickness (considering production and assembly tolerances) of a gap placed between two elements coupled with a clearance.

For merely exemplary purposes, in order to underline that such architecture allows to process the crankcase in a precise way leaving the head obtained by moulding, the annular lateral surface 120 of the housing seat 110 may be made with a displacement from the nominal diameter of the H7 type (according to UNI 6388 ISO R.286) and the annular lateral surface 285 of the other housing seat 270 may be made with a displacement from the nominal diameter of the H8 type.

The head is joined to the crankcase by threaded connecting means 295 which substantially clamp the annular body 100 inside the respective housing seats.

The crankcase, as the head, may be made of a polymeric material.

In such a case in the crankcase they are present inserts 300 provided with a female thread which allow to tighten a threaded connecting member, such as a screw, which is fitted through the head by a hole made in the head.

Preferably the pump comprises a plurality of threaded connecting members, for instance in the same amount as the cylinders, configured to fix the head 20 to the crankcase 5 and that are inserted in an equal amount of through holes obtained in the head 20. For example, the pump can comprise a lid 305, for instance made of metal, and the threaded connecting members allow to clamp the head between the crankcase and said lid.

Preferably, the pump can comprise a pre-load ring 310 which is partially inserted in the first housing seat 150 and projects out of the annular body through the opening of the first housing seat. In particular it projects through said opening, beyond the first face of the annular body, i.e. beyond a lying plane of such first face.

Such pre-load ring contacts the first sealing annular gasket and the housing seat, such that when the head and the crankcase are fixed to each other, the pre-load ring touches the housing seat 110, i.e. the support annular surface 115 of such housing seat, and presses the first annular gasket in order to pre-load it, which operation is for putting it in contact with the piston even in low pressure or zero-pressure conditions.

When such pre-load ring 310 is present there is a gap between the first face of the annular body and the annular abutment surface of the housing seat. Therefore the two surfaces do not touch.

The first sealing annular gasket is thus in contact only with the piston, the annular body (i.e. the surfaces of the respective first housing seat) and the pre-load ring. The second sealing annular gasket is in contact only with the piston and the annular body (i.e. the surfaces of the respective second housing seat).

The pre-load ring 310 has for instance a T-shaped cross section.

The pump 1 may comprise a suction valve 315 and a delivery valve 320 for the cylinder 15, i.e. one for each cylinder 15, the valves of which are automatic and single-acting and allow to define the flow direction from and to the pumping chamber 30. In particular the suction valve 315 allows the flow only to the pumping chamber 20 and the delivery valve 320 allows the flow only from the pumping chamber 20.

It is specified that automatic valve refers to a valve configured to open automatically allowing fluid communication, between two environments between which it is interposed, when a pre-set difference between the pressures in both environments divided by the valve itself is reached. Specifically, automatic valves do not exploit electromechanical operating mechanisms but only differences in pressure.

Each suction valve 315 comprises an inlet mouth and an outlet mouth, which is in fluid communication with the pumping chamber, and each delivery valve 320 comprises an inlet mouth, which is in fluid communication with the pumping chamber, and an outlet mouth.

The pump 1 comprises a respective housing seat for each suction valve 315 obtained directly in the head, for example obtained directly in the head as a hollow provided with an opening in an outer surface of the head which flows out of the head and is closed by a suction cap 325 configured to maintain the respective suction valve 315 in position in its housing seat. In the embodiment shown, such opening of the valve seat corresponds to the second opening 40 and the suction valve cap is kept in position by the lid 305.

In the embodiment shown the suction valves are therefore substantially coaxial with the respective cylinder 15.

In the embodiment shown the pump further comprises a suction channel for the delivery of the liquid to be pumped to the cylinders, which comprises a first tract 330 substantially coaxial with the common axis of the cylinders and from which the ducts 335 branch out reaching the suction valve seats.

The suction channel, in particular its first tract 330, is in fluid communication with the drainage channel 215 of the annular body 100 by a suitable duct made in the head.

The pump 1 comprises a housing seat for each delivery valve 320 obtained directly in the head, for example obtained directly in the head as a hollow provided with an opening that flows out of the head and is closed by a delivery cap 340 configured to maintain the respective delivery valve 320 in position in its housing seat.

In particular, to fix the delivery cap 340 to the head, being the latter made of material, the invention provides for the presence of a metal insert 345 in the head provided with an inner thread to allow screwing the cap, which is thus provided with an outer thread.

The housing seat of the delivery valve is connected to the cylinder directly or by a duct as in the embodiment shown.

The pump 1 also comprises a delivery channel for collecting the pumped liquid, which is in direct fluid communication with the delivery valves, and is placed downstream thereof in relation to the fluid direction when the pump is in use. For example, the delivery channel is in direct fluid communication with the outlet mouth of each delivery valve 320. The operation of the pump according to the invention is as follows.

Following the movement of the inclined rotating plate, in one or more cylinders at the same time, the movement of the respective piston towards a bottom dead centre generates a vacuum inside the pumping chamber, which in turn causes the respective delivery valve to close and the respective suction valve to open. Thereafter, the liquid is sucked and reaches the corresponding pumping chamber 20 crossing the respective suction valve. Having reached the bottom dead centre, the piston rises towards the top dead centre following the thrust of the rotating plate, generating an overpressure in the pumping chamber which closes the suction valve and opens the delivery valve.

During such operation the piston rubs against the first and second sealing gasket optimally, hence evenly, thanks to the centering obtained by the annular body, which further allows a simpler and quicker assembly of the pump.

The invention thus conceived is susceptible to several modifications and variations, all falling within the scope of the inventive concept.

Moreover, all the details can be replaced by other technically equivalent elements.

In practice, the materials used, as well as the contingent shapes and sizes, can be whatever according to the requirements without for this reason departing from the scope of protection of the following claims.

The invention claimed is:

1. A piston pump for pumping a liquid comprising:
   a head in which at least a cylinder is disposed,
   a piston slidably inserted in the cylinder,
   a first sealing annular gasket which circumferentially sealingly contacts the piston,
   a second sealing annular gasket which circumferentially sealingly contacts the piston, and
   an annular body, which circumferentially encloses the piston, and which is at least partially accommodated in a housing seat disposed in the head in a portion of the cylinder,
   said annular body comprising:
      a first housing seat in which the first sealing annular gasket is housed,
      a second housing seat in which the second sealing annular gasket is housed, and
      a third housing sea in which a third sealing annular gasket is housed, which is interposed between the annular body and the housing seat of the annular body, the piston pump comprising a crankcase fixed to the head, which is provided with an annular guide surface of the piston, and another housing seat of the annular body, which accommodates a portion of the annular body projecting from the head, wherein the annular body is accommodated in the housing seat disposed in the head with a predetermined clearance value greater than a predetermined clearance value with which the annular body is inserted in the other housing seat obtained in the crankcase.

2. The pump according to claim 1, wherein at least a head portion, wherein the cylinder and the housing seat of the annular body are disposed, is made of a polymeric material.

3. The pump according to claim 1, wherein the extension of the first housing seat in a direction parallel to the sliding axis of the piston in the cylinder is greater than the extension in the same direction of the first sealing annular gasket.

4. A piston pump for pumping a liquid comprising:
   a head in which at least a cylinder is disposed,
   a piston slidably inserted in the cylinder,
   a first sealing annular gasket which circumferentially sealingly contacts the piston,
   a second sealing annular gasket which circumferentially sealingly contacts the piston, and
   an annular body, which circumferentially encloses the piston, and which is at least partially accommodated in a housing seat disposed in the head in a portion of the cylinder,
   said annular body comprising:
      a first housing seat in which the first sealing annular gasket is housed,
      a second housing seat in which the second sealing annular gasket is housed, and
      a third housing sea in which a third sealing annular gasket is housed, which is interposed between the annular body and the housing seat of the annular body
   wherein the piston has a first end which is always contained in the cylinder, the first housing seat has an opening directed towards such first end and wherein the pump comprises a pre-load ring inserted in said opening, which contacts the first sealing annular gasket and which projects out of the annular body through said opening.

5. The pump according to claim 1, wherein the pump is of the type with axial pistons and rotating inclined plate with automatic suction and delivery valves, provided with a plurality of cylinders parallel between each other in which respective pistons slide for pumping liquid.

* * * * *